United States Patent Office 2,985,854
Patented May 23, 1961

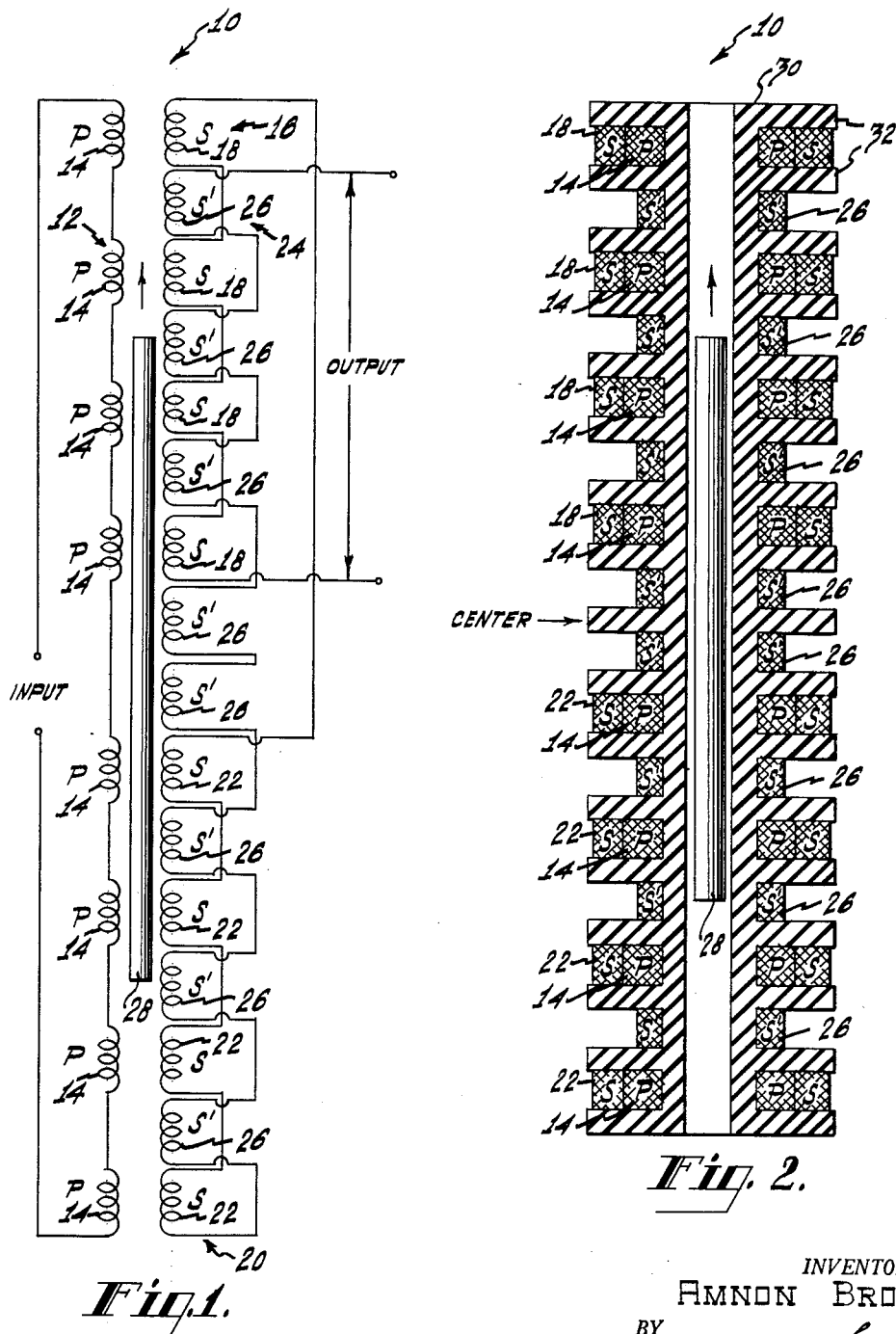

2,985,854

DIFFERENTIAL TRANSFORMER

Ammon Brosh, Philadelphia, Pa., assignor to Schaevitz Engineering, a corporation of New Jersey Filed Feb. 6, 1958, Ser. No. 713,593

11 Claims. (Cl. 336—30)

This invention relates to differential transformers, and more particularly to differential transformers designed for a wide linear range of core movement.

Differential transformers are utilized in a large number of measuring and controlling systems, such as accelerometers, fluid pressure gages, strain measurement devices, telemetering and other dynamic and static indicating, operating and controlling devices in any situation where the magnitude of a displacement of any type is to be measured. The differential transformer generally includes a movable core adapted to be moved in accordance with a measured function, such as a displacement of a body. The movable core is generally disposed between primary and secondary windings and provides a path for magnetic flux linking the coils. The secondary winding of the transformer generally includes a pair of substantially similar coils connected in series opposition or bucking relationship.

When the primary winding of the transformer is energized with alternating current, voltages are induced in the two secondary coils. Since the two secondary coils are connected in series opposition, the two voltages induced in the two coils are opposite in phase. Therefore, the net output of the transformer is the difference of the voltages induced in the two secondary coils. For one position of the core, equal voltages are induced in the two secondary coils resulting in a net zero output voltage. When the core is positioned for zero output volts, the core is said to be at the balance point or null position.

When the core is moved from its null position, the voltage induced in the secondary coil towards which the core is moved increases, while the voltage induced in the secondary coil from which the core is moved decreases. The variations in induced voltages are due primarily to the changes in the magnetic flux path between the primary coil and the respective secondary coils resulting from the relative movement of the core. When the core is thus moved from its null position, a differential output voltage across the output circuit of the transformer results. With proper design, the output voltage from the transformer varies linearly with changes in the core position while the core is being moved within the limits of its linear range. Motion of the core in the opposite direction from the null position produces a similar voltage characteristic across the output circuit of the transformer with the phase shifted 180°.

When a large linear range of core movement, or long core stroke, is required for measuring a relatively large movement or displacement of a body, the use of a single primary coil and a pair of secondary coils has proven to be impractical in many cases. This is due to the non-linearity which results when the core is moved too great a distance from its null operating position. Such non-linear operation may result from flux leakage, excessive capacity between the secondary windings or various other factors. The conditions which tend to produce non-linear operation for long core strokes may be compensated to some extent by the use of multiple coils in the primary and secondary windings. The arrangement involving multiple core windings helps provide a more equal distribution of the primary winding magnetic flux and decreases the inter-winding capacity which tends to introduce non-linear operation. Proper design of the transformer with special attention being given to core length, greater linear operating ranges for relatively large core movements are attainable. The improved linear operation resulting from the use of multiple coils may further be improved by slightly varying the relative number of turns in the coils to vary the turns ratio at different locations for different positions of the core.

In differential transformers of both the long and short core stroke types existing heretofore, substantially zero output volts is developed when the core is centrally disposed between the two secondary windings. The single ended linear range of such differential transformers may be considered as that range of unidirectional core movement which produces a linear output voltage when the core is moved from its null position to the limit of its linear range. Movement of the core from its null position in the opposite direction produces a linear output voltage opposite in phase to the first produced voltage. The full linear range of such differential transformers may therefore be considered as being twice its single ended linear range. The full linear range of conventional transformers may be considered as double ended since two directions of core movement from its null position is necessary to provide the full linear operating range.

In many cases, measurements are involved in which only one direction of core movement from its null position is required. While such conventional differential transformers of the types described have proven satisfactory in some such cases, present day demands for greater range measurements in smaller and lighter transducers have created many situations wherein the size and weight of such conventional differential transformers are excessive for the desired range of measurement.

When only one direction of core movement from a null reference point is necessary to measure a function or displacement of a moving body, only the output voltage of a single phase is used. Thus only one half of the full linear range of the conventional differential transformer is utilized in many cases. It is seen, in these cases, that the conventional differential transformer employed must have a full linear operating range which is greater than the single ended linear range actually used in the measurement operation. In many cases the full linear operating range of the conventional differential transformer is twice the single ended range used.

Means for utilizing the full linear range of differential transformers in a single ended output operation by shifting the null operating position of such transformers is described in detail in a co-pending patent application of A. Brosh entitled "A Transducer," Serial No. 708,848, filed January 14, 1958, and assigned to the same assignee as the present invention.

In wide range differential transformers involving a long core stroke, increased size becomes more apparent than in short core stroke differential transformers. Again, where measurements involving a single direction of core movement from its null position is necessary, it is highly desirable that the single ended range of operation be close to the full operating linear range of the transformer. Utilizing the full linear range in single ended operation as described in the aforementioned patent application, makes it possible to greatly reduce the size of such wide range differential transformers. Likewise, transformers utilizing a single ended output for the full linear range of operation makes it possible to produce transformers having substantially twice the single ended linear range as conventional transformers of comparable sizes.

It is an object of this invention to provide an improved differential transformer designed for long linear core stroke wherein a wide output linear range of operation is obtained for a single direction of core stroke from a null reference position.

It is still a further object of this invention to provide an improved differential transformer designed for long linear core stroke having substantially twice the single ended linear operating range of similar types of differential transformers existing heretofore.

It is still a further object of this invention to provide an improved differential transformer designed for long linear core stroke wherein the single ended useful linear range of operation is increased without adding substantially to the size of such transformers.

In accordance with the present invention, a wide range differential transformer for long linear core stroke is provided. The transformer includes a primary winding having a plurality of serially connected coils and a pair of secondary windings connected in series opposition. Each of the secondary windings also include a plurality of coils. An additional secondary winding is electrically connected between the pair of secondary windings to provide means for shifting the null operating point of the transformer. A core, adapted to be moved over a wide linear range, provides a coupling path between the primary and secondary windings.

Other objects and advantages of the present invention will be apparent and suggest themselves to those skilled in the art to which the present invention relates from a reading of the following specification and claims in conjunction with the accompanying drawing, in which:

Figure 1 is a schematic diagram of an electrical circuit illustrating one form of a differential transformer embodying the present invention; and, Figure 2 represents a longitudinal vertical cross section of a physical embodiment of the differential transformer illustrated in Figure 1.

Referring particularly to Figure 1, a differential transformer 10 includes a primary winding 12 having a plurality of serially connected coils 14. A pair of secondary windings 16 and 20 are connected in series opposition or bucking relationship. The secondary winding 16 includes a plurality of coils 18 connected in series. The secondary winding 20 includes a plurality of coils 22 also connected in series. An additional secondary winding 24, including a plurality of secondary coils 26, is serially connected with the opposed series connected arrangement of the secondary windings 16 and 20. A core 28 is disposed between the primary and secondary windings to provide a magnetic coupling path therebetween. The core 28 is adapted to be moved over relatively wide linear ranges to vary the degree of coupling between the primary winding 12 and the secondary windings 16, 18 and 24.

An input A.C. (alternating current) signal may be applied to the primary winding 12. In the absence of the additional secondary 24, as in conventional transformers existing heretofore, the combined output signal from the secondary windings 16 and 20 would be a voltage of one of two phases, depending upon which of the secondary windings had the greater voltage developed thereacross. The induced voltage, in turn, would be dependent upon the direction of the movement of the core 28. The phase of the output voltage from the transformer would be indicative of the direction of movement of the core 28. The amplitude of the combined output voltage from the bucking secondary windings 16 and 20 would represent the degree of movement or displacement of the core 28 from its null position in such conventional transformers.

The additional secondary winding 24, connected in the manner illustrated, provides means for producing a linear output voltage from the transformer 10 which is variable from substantially zero throughout substantially the full range of linear core movement. The single ended output voltage from the transformer, in this case, may be made substantially double the single ended output voltage obtainable without the use of the additional secondary winding 24. The single ended output voltage for the full linear operating range of the transformer is achieved by effectively adding the voltage developed across the additional secondary winding 24 to the combined voltage developed across the windings 16 and 20. The voltage developed across the additional secondary winding 24 is of such a phase relationship and connected in such a manner with respect to the secondary windings 16 and 20 so as to add to the output voltages developed by the secondary windings 16 and 20. By adding the voltage developed across the additional secondary winding 24 with the output voltage developed across the secondary windings 16 and 20, the null operating position of the core 28 is effectively shifted. The degree of shift in the null operating positon of the core 28 is dependent upon the relative values of the voltage across the additional secondary winding 24 with respect to the voltages across the secondary windings 16 and 20. In a preferred form, the voltage across the additional secondary winding 24 is substantially equal to the combined output voltage developed across the secondary windings 16 and 20, when the core 28 is at one end of the linear range, which would be obtainable if the additional secondary winding 24 were not present. When the additional secondary winding 24 is added and the voltage developed thereacross is made substantially 180° out of phase with the resultant combined voltage of the secondary windings 16 and 20 at one end of the linear range of the core movement, or stroke, the null operating position of the core 28 is effectively shifted to provide a greater single ended linear operating range than the single ended linear range obtainable without the additional secondary winding 24. When the voltage developed across the additional secondary winding 24 is substantially 180° out of phase and less than the resultant combined voltage developed across the secondary windings 20 and 24, greater single ended linear range is obtained than would be obtainable without the additional secondary winding 24, as in conventional differential transformers. When the voltage across the additional secondary winding 24 is substantially equal to the combined resultant voltage developed across the secondary windings 16 and 24, substantially twice the single ended linear range of operation is obtained. Thus, it is seen that the additional secondary winding 24 in effect creates a new null operating position for the core 28.

Movement of the core from the new null position produces a single ended output voltage from the secondary windings which may be variable from a null position throughout the full linear range of the movement or stroke of the core 28. Thus, in cases where it is desired to measure core movement in a single direction, the useful linear range of the transformer designed for long core stroke embodying the present invention may be made effectively double the single ended linear range of previous differential transformers designed for long core stroke.

Referring particularly to Figure 2, a physical embodiment illustrating one form of the present invention is illustrated. The differential transformer 10 includes a hollow cylindrical coil from 30 having a plurality of radially extending fins or ribs 32. The ribs 32 are equally spaced to provide annular grooves adapted to receive coils.

Coils 14 of the primary winding 12 are disposed within alternate grooves of the differential transformer 10 on the top and bottom halves of the transformer extending away from the center. The coils 18 of the secondary winding 16 are wound within the same grooves as the primary coils 14 in the upper half of the differential transformer 10. The secondary coils 22, of the secondary winding 20, are disposed within the same grooves as the primary coils 14 in the lower half of the differential transformer 10.

The coils 26, of the additional secondary winding 24, are disposed within the alternate grooves between those occupied by the coils 14. In order to provide symmetry between the lower and upper halves of the transformer 10, two of the secondary coils 26 are disposed within the two centrally located grooves of the differential transformer 10.

The core 28 is adapted to be moved over relatively long strokes within the hollow coil form. It is seen that as the bottom of the core 28 is moved away from the magnetic field of one of the lower primary coils 14, its top end starts to engage the magnetic field of one of the primary coils 14 in the upper half of the transformer 10. Thus, it is seen that the core 28 engages, or is effected by, substantially the same number of turns in the coils 14 as it is moved throughout a relatively wide range. The relative continuously uniform magnetic field between the primary coils 14 and the movable core 28 for long strokes or core movements makes it possible to extend the linear operating range of the differential transformer 10 beyond the range attained by those differential transformers involving only a single primary and a pair of secondary windings.

Separating of the primary winding 12 and secondary windings 16, 20 and 24 into separate coils, as previously mentioned, reduces the winding capacity to aid in extending the linear operating range of the differential transformer 10. Varying the number of turns in the coils at different locations to vary the turns ratio, as previously mentioned, may be employed to further extend the linear operating range of the differential transformer 10.

While transformers designed for long core stroke or movement have been used in the past, the size of such transformers has been excessive and, in most cases only one half of the full linear range has been used, since measurements relating only to unidirectional core movements have been involved. The additional secondary winding 24, connected in the manner shown, makes it possible to utilize the full linear range of the differential transformer while employing single ended operation. The size of such differential transformers designed for long core stroke may be greatly reduced when embodying the present invention.

Various other forms, other than that shown, may of course be employed in differential transformers designed for long stroke or core movement. For example, in some cases, it may be possible to employ an additional secondary winding 24 which comprises only a single coil. Multiple coil arrangements may employ relatively wide coil forms rather than the elongated coil form illustrated.

The grooves in the hollow coil form illustrated are provided merely as a convenient means for winding the coils. It is apparent that the coils may be pre-wound and disposed in the proper position surrounding the core without employing grooves or the particular type of hollow coil form illustrated.

It is also possible that the winding operation involving the additional secondary winding may be combined with the winding operation of one of the secondary windings which are connected in bucking relationship. The physical separation of the additional secondary winding from the other windings is not necessary in all cases in practicing the present invention. Numerous modifications of the differential transformer illustrated may of course be employed without departing from the scope of the present invention.

In the present application, the term "wide linear range" shall be construed to mean a range greater than the single ended linear range of conventional transformers existing heretofore.

What is claimed is:

1. A differential transformer comprising a primary winding having a plurality of serially connected coils, a pair of secondary windings connected in series opposition, each of said secondary windings having a plurality of serially connected coils, means for applying a source of alternating current to said primary winding, a core adapted for a wide linear range of movement from a single null position disposed to provide a magnetic coupling path between said primary and secondary windings, the core and windings being movable relative to each other during operation of the differential transformer in performing a motion pick-up function, the movement of said core in one direction acting to increase the flux linkage between the primary winding and one of the secondary windings and to decrease the flux linkage with the other secondary winding thereby to produce a net differential voltage across the two secondary windings with a magnitude which is a linear function of the displacement of said core, and an additional secondary winding including a plurality of serially connected coils connected to shift the null operating position of said core to provide a wide range of linear operation when said core is moved from a null position in a single direction.

2. A differential transformer as set forth in claim 1 wherein said additional secondary winding is electrically connected in series with said pair of secondary windings.

3. A differential transformer as set forth in claim 2 wherein a voltage is developed across said additional secondary winding, with said voltage being substantially 180° out of phase with a voltage developed across said pair of secondary windings.

4. A differential transformer for measuring wide ranges of body displacement comprising a hollow coil form, a primary winding including a plurality of serially connected coils disposed around said coil form, a pair of secondary windings connected in series opposition disposed around said coil form, each of said secondary windings including a plurality of serially connected coils, a core member adapted to be moved over a wide linear range within said coil form from a single null operating position to provide a magnetic coupling path between said primary and secondary windings, and an additional winding including a plurality of serially connected coils disposed around said coil form connected to shift said null operating position of said core member.

5. A differential transformer as set forth in claim 4 wherein said coil form includes a plurality of radially extending ribs providing grooves therebetween.

6. A differential transformer as set forth in claim 5 wherein the coils of said additional secondary winding are serially connected with the coils of said pair of secondary windings.

7. A differential transformer as set forth in claim 6 wherein the coils of said primary winding are disposed in the same grooves as the coils of said pair of secondary windings.

8. A differential transformer for measuring body displacements of relatively wide amplitudes comprising a hollow multi-ribbed coil form having a plurality of grooves, a primary winding having a plurality of serially connected coils, at least two secondary windings connected in series opposition, each of said secondary windings having a plurality of serially connected coils, the coils of said primary and secondary windings being disposed within the same grooves of said coil form, a core member providing a single null operating position and disposed within said coil form to engage substantially the same number of coils of said primary winding throughout relatively long ranges of movement thereof, and an additional secondary winding including a plurality of serially connected coils connected to shift the null operating position of said core member.

9. A differential transformer as set forth in claim 8 wherein said plurality of serially connected coils is disposed in staggered relationship in the grooves between the grooves in which the coils of said primary and secondary windings are disposed.

10. A differential transformer as set forth in claim 9 wherein said additional secondary winding is electrically serially connected with said first mentioned two secondary windings.

11. A wide range differential transformer comprising an elongated hollow cylindrical coil form having a plurality of radial fins projecting therefrom to form grooves therebetween, a primary winding having a plurality of serially connected coils disposed within alternate grooves of said coil form, a pair of secondary windings connected in series opposition, each of said secondary windings including a plurality of an equal number of serially connected coils, said number being equal to one half the number of said primary coils, said coils of said secondary windings being disposed within the same grooves as said primary coils and concentrically therewith, an additional secondary winding including a plurality of coils equal in number to said primary coils, said additional secondary coils being disposed within the alternate grooves of said coil form between said primary coils, and a core member disposed within said coil form and extending along a substantial length thereof.

References Cited in the file of this patent

UNITED STATES PATENTS

| | | |
|---|---|---|
| 2,424,766 | Miner | July 29, 1947 |
| 2,568,588 | MacGeorge | Sept. 18, 1951 |